Jan. 13, 1953 — M. S. JENNINGS — 2,625,119
AUTOMATICALLY OPERATING MACHINE FOR FILLING
BAKED ARTICLES WITH FLUID MATERIAL
Filed March 15, 1950 — 2 SHEETS—SHEET 2

INVENTOR.
MILTON S. JENNINGS
BY *A. J. Nydick*
Atty

Patented Jan. 13, 1953

2,625,119

UNITED STATES PATENT OFFICE 2,625,119

AUTOMATICALLY OPERATING MACHINE FOR FILLING BAKED ARTICLES WITH FLUID MATERIAL

Milton S. Jennings, New York, N. Y.

Application March 15, 1950, Serial No. 149,729

6 Claims. (Cl. 107—1)

This machine relates to machines for filling baked goods such as doughnuts with jelly; and in particular is directed to machines which make the filling operation fully automatic.

It is, accordingly, among the principal objects of this invention to provide the bakery art with machines that make the filling operations of doughnuts and the like fully automatic.

The customary practice of filling baked goods of the above described class involves either wholly manual operations, or at best manual operations coupled with mechanical assistance. Great advantages are therefore presented by a machine which enables the baker to carry out filling operations by fully automatic means. The sanitary features and diminution of production costs so provided are particularly valuable.

In its principal aspects the principal objects of this invention are achieved by a machine that is provided with: (a) means to feed the doughnuts or the like to the filling mechanism, (b) a filling mechanism comprising a continuously moving arrangement of tubular members each adapted to impale a doughnut, (c) means for forcing the "filling" through the tubular members at a selected stage to accomplish the injection operation, and (d) means for removing the filled objects.

In its more specific aspects the principal objects of this invention are achieved by a machine having: (a) doughnut feeding mechanism in the form of a hopper which may be provided with vibratory mechanism to prevent jamming or clogging of the doughnuts in the chute leading to the station where each doughnut is impaled on the injection tube, (b) a filling mechanism comprising essentially a rotating cylindrical jelly reservoir assembly having a plurality of equi-distantly spaced circumferentially disposed units of injection tubes and doughnut guiding means, said reservoir being provided with means to exert pressure on the jelly and force the same at a selected stage in the movement of the mechanism into the doughnut, and (c) a mechanism to remove the filled doughnut.

The objects and advantages of this invention will become more evident from the more detailed description thereof taken in connection with the accompanying drawings wherein.

Referring more particularly to the drawings the reference symbol H designates the hopper assembly and the symbol R the rotatable jelly reservoir assembly.

Figure 1:
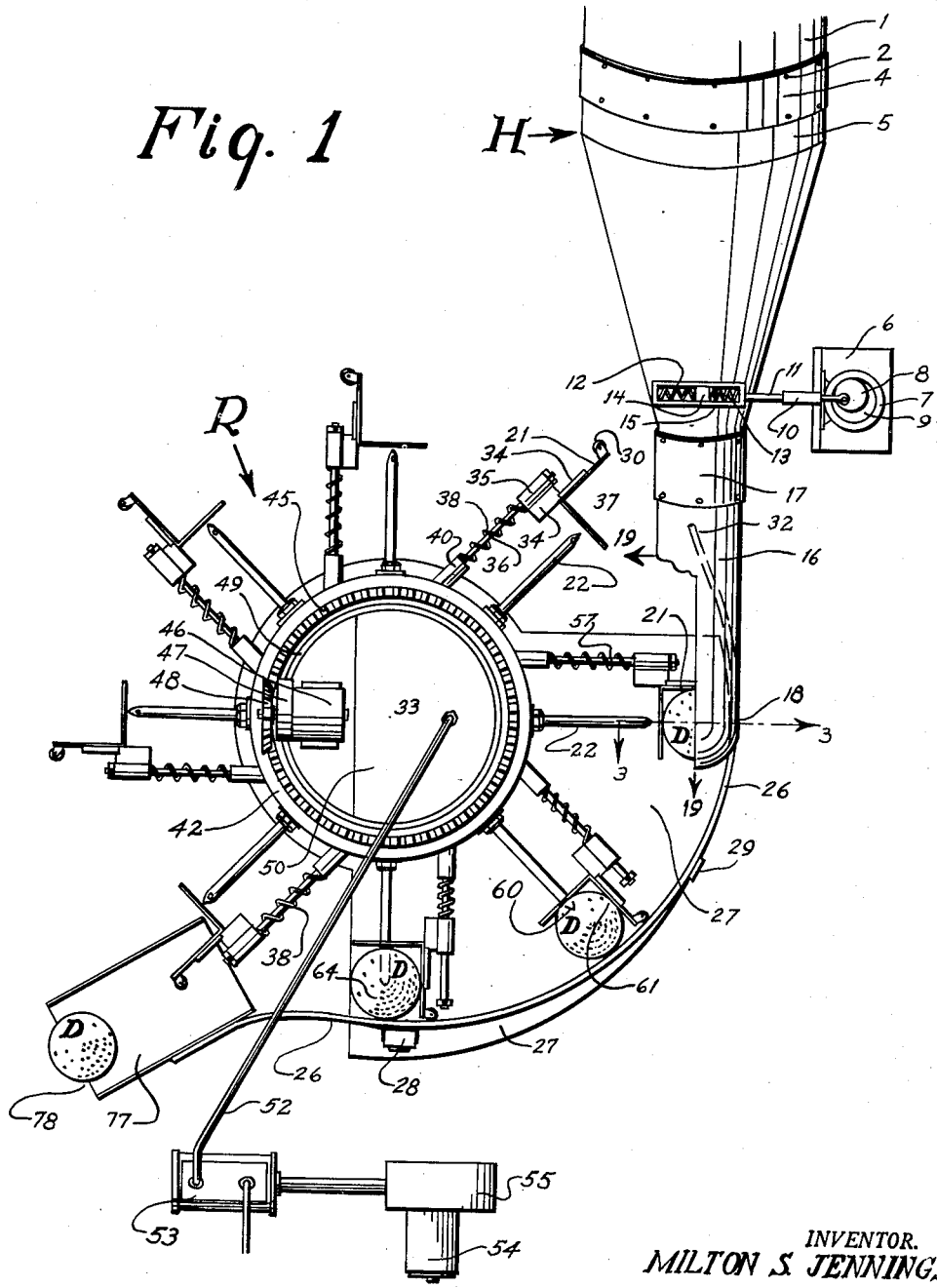
Fig. 1 is a plan view of an automatic machine with the doughnut hopper thereof omitted but showing the lower part of its feeding duct or chute which conveys the doughnuts to the filling mechanism.
Figure 2:
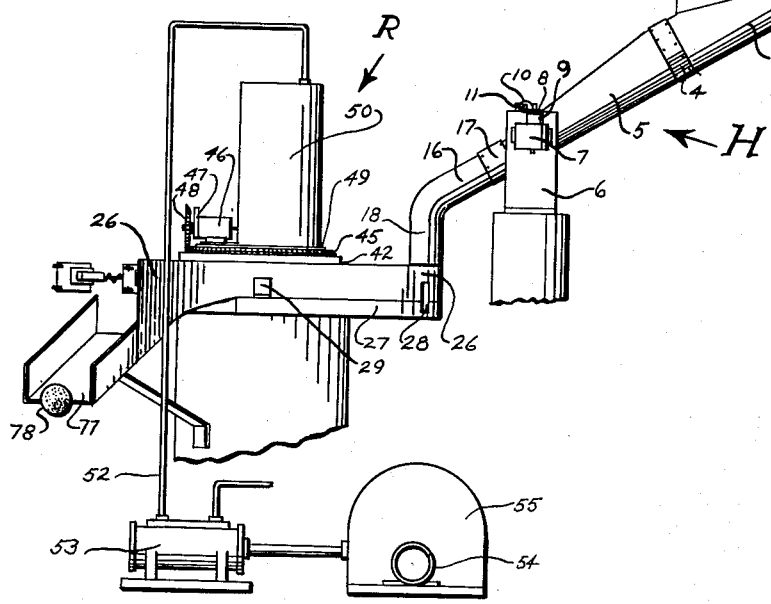
Fig. 2 is a vertical view of the machine shown in Fig. 1.
Figure 3:
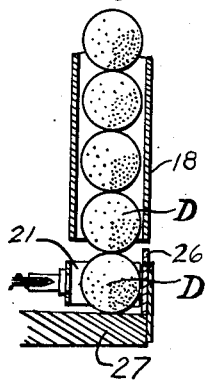
Fig. 3 is a sectional view taken on the line 3—3 of Fig. 1 showing the exit section of the feeding chute and illustrating the means by which a regular supply of doughnuts is furnished to the filling mechanism.

The hopper assembly H comprises a bin for containing a supply of doughnuts, the lower part of said bin being designated by the reference numeral 1, which is affixed, as by rivets 2, to a section of tubular flexible material such as rubber 4, which in turn is affixed, as by rivets, to section 5 which may be of sheet metal, as may be the bin, and the chute 16. In order to maintain a steady flow of doughnuts and to prevent the jamming thereof in the said sections, there may be provided means for effectuating the vibration of section 5. Such vibration may be achieved by a unit formed of a supporting member 6 on which is a motor 7, appropriately geared through gear box 9 to a cam 8 which imparts a reciprocating motion to connecting rod 11 which slides through guide 10 which may be integral with support 6. The connecting rod 11 is attached to slide 15. The vibratory reciprocating motion is transmitted to a peglike member 14 which is rigidly attached to section 5 through springs 12 and 13 which bear at one end against the slide member 15 and at the other end against the peg-like member 14. The use of springs 12 and 13 in transmitting motion allows the vibration to be somewhat dampened. The extent of the damping may be varied by incorporating appropriate means for changing the tensions of the springs. It will be observed that section 5 is attached to chute 16 by means of an intermediate tubular section 17 of rubber or any other appropriate material. Chute 16 terminates in a vertical section, as at 18, more particularly shown in Fig. 2. In Fig. 1 a portion of chute 16 is shown to be removed, along the line 19—19, thus revealing a plan view of a doughnut as it is positioned in the initial stage of the actual filling operation, i. e., as it is about to be carried forward by an injection unit.

The injection unit at such initial stage comprises the guide vane 21 and the needle 22. Vane 21 supports the doughnut D which bears against the arcuately disposed shield 26, said shield being affixed to a table 27, as at 28 and 29. As the movable ring 42 of reservoir assembly R rotates, the decreasing radius of the shield 26 with respect to the center point 33, causes the needle to enter the doughnut, and the vane to move radially toward said center. The guide vane provided with a forwardly disposed roller or wheel 30, is secured to a plate member 34 which is secured to a slideable member 35 mounted on the spindle 36. The outermost radius to which the slide 35 may travel is controlled by the setting of the adjustable stop 37. The spring 38 maintains the slide 35 against the stop 37 at its greatest radial distance along the spindle 36. The spindle 36 may be of square cross-section in order to make positive that the vane be maintained in its vertical plane. The rear end of the spring 38 bears against the base 40, to which the spindle 36 is affixed, and said base 40 may be integral with or attached to the ring member 42. The tubes or needles 22 are also attached to the ring member 42. A plurality of units comprising a tube or needle-like member 22 and a guide vane member are disposed at regular intervals on the circumference on the ring member, eight of such units or asemblies being shown in Fig. 1.

The rotatable ring member 42 may be provided with an annular bevel gear 45. Rotation of the ring is effectuated by means of a motor 46 the motion of which is transmitted through gear box 47 to beveled gear 48, the rotation of which turns gear 45. In this way the ring 42 is caused to rotate smoothly and continuously around the center point 33. The ring 42 may be held vertically in position by an upper and lower bearing ring, as the bearing ring 49, affixed to the top of ring 42, and a similar bearing ring provided with a cover plate, not shown, positioned underneath the ring 42. A jelly tank 50 is affixed to bearing ring 49. The combination of the ring 42, the upper bearing ring and jelly tank, and the lower bearing ring and its cover plate thus constitute a rotatable jelly reservoir with circumferentially disposed injection units.

Jelly may be supplied at a regulated pressure to the tank 50 through pipe 52, appropriately sealed at its entrance to 50, by means of the pump 53 which may be driven by the motor 54 through mechanism 55 which converts the rotation of the motor 54 into reciprocating motion.

Figure 4:
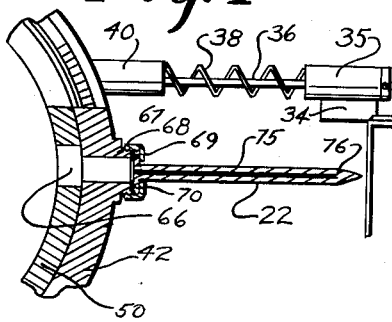
Fig. 4 is a view, partly in section showing a method of attaching one of the filling tubes or needles to a rotating ring, forming part of the jelly reservoir assembly, which carries the needles, and which in turning brings the filling needles to the various points in the filling cycle.
Figure 5:
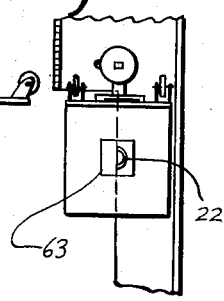
Fig. 5 is a profile view of Fig. 4, illustrating the opening in the vanes guiding the doughnuts which allows the said guide vane to slide back over the needle.

The operation of this automatic machine starting with the guide vane 21, as it is about to sweep doughnut D from underneath the vertical section 18 of chute 16 is as follows: the doughnut is engaged by the guide vane 21 in the corner thereof while the shield 26 holds the same, such holding being in the form of a 3 sided open box. The doughnut thus contained is forced radially inward as the ring 42 turns in the direction of decreasing shield radius and the doughnut becomes impaled on the needle 22 as shown at 60 in partially penetrating position. The guide vane passes back over the needle, the vane being provided with a hole 63 to allow for such movement. In the position occupied by the needle at full penetration, as at 64, the doughnut thereon is impaled to maximum depth, slightly past the center of the doughnut, and the guide vane is at its shortest distance from the center point 33. The doughnut thus reaches the position for filling with the jelly. In Fig. 4, there is shown the position occupied by the needle as at 64 in Fig. 1 but the doughnut and the shields 26 are omitted, so that the guide vane is shown at its greatest radial position. In this position the jelly tank is provided with a port 66. It will also be seen that when the ring 42 has reached this point hole 67 thereof is in registry with the port 66 thus providing a direct communication between the jelly reservoir and the doughnut so that the jelly may be injected into the doughnut under the pressure exerted on the jelly.

The needle 22 may be attached to the threaded projection 68 of the ring 42 by means of a union nut 69 and the joint made tight by means of the gasket 70. It will also be noted that needle 22 is provided with a bore 75 which communicates with the hole 67. The bore 75 terminates in an orifice 76 near the tip of the needle allowing the jelly to flow into the duct when the needle is positioned so that it is in registry with the port 66.

As the rotation of the ring 42 carries the needle past the port 66 the radius of the shield 26 increases, thus allowing the guide vane to move outward under the force of the spring 38 and thereby forcing the filled doughnut off the filling needle and delivering it to the discharge chute 77 from which it falls off as at 78. Each of such cycles from impalement of a doughnut, penetration thereof by the needle and through the filling thereof with the jelly until delivery to the discharge chute is repeated as each of the units picks up a doughnut in the course of the automatic operation thus described.

It will be manifest that the automatic filling mechanism may be used for the filling of baked goods with fluid materials capable of being injected under pressure into the body of such baked goods.

It is to be understood that the foregoing description of the invention and the embodiment shown is merely illustrative of the invention. Accordingly the appended claims are to be construed as defining this invention within the full spirit and scope thereof.

I claim:

1. In an automatically operating machine for filling baked articles with a fluid filling material, a reservoir for the fluid material, a rotatable ring surrounding said reservoir, said ring having a plurality of equidistantly, circumferentially disposed injection needles, said reservoir having a port to communicate with one of said needles, means to impale said baked articles one at a time to each of said needless, said means comprising a slideable member affixed to the said rotatable ring for holding the article and positioned rearwardly of the needle, and an arcuate shield of diminishing radius whereby rotational movement of the ring forces the article onto the needle thereby to achieve the penetration of article to a predetermined point, and means to exert pressure on the fluid material in the reservoir whereby the fluid material will enter the article when the aforesaid port and needle are in registry.

2. In an automatically operated machine for filling baked articles with a fluid filling material, a rotatable reservoir assembly for the fluid material, said rotatable reservoir assembly having a plurality of equidistantly, circumferentially disposed injection needles, said reservoir assembly having means to control fluid communication with one of said needles at a selected station, means to impale said baked articles one at a time to each of said needles, said means comprising a slideable article guide member, affixed to said reservoir assembly, and a shield of arcuately disposed diminishing radius whereby rotation of said reservoir assembly forces the article onto the needle thereby to achieve the penetration thereof to a predetermined point, and means to exert pressure on fluid material in said reservoir assembly whereby said fluid material will enter the article when the reservoir assembly is in fluid communication with needle at the aforesaid selected station.

3. In an automatically operated machine for filling baked articles with a fluid filling material in accordance with claim 2, the structure wherein the slideable article guide member comprises a spindle support affixed to the rotatable reservoir assembly, a spindle affixed to said support, a vane slideably mounted on said spindle, and a spring to maintain said vane under slideable tension.

4. In an automatically operated machine for filling baked articles with a fluid filling material in accordance with claim 3, means to maintain the vane against rotation around said spindle.

5. In an automatically operated machine for filling baked articles with a fluid filling material in accordance with claim 1, the structure wherein the slideable member for holding the article comprises a spindle support affixed to the rotatable ring, a spindle affixed to said support, a vane slideably mounted on said spindle, and a spring to maintain said vane under slideable tension.

6. In an automatically operated machine for filling baked articles with a fluid filling material in accordance with claim 5, means to maintain the vane against rotation around said spindle.

MILTON S. JENNINGS.

REFERENCES CITED

The following references are of record in the file of this patent:

UNITED STATES PATENTS

| Number | Name | Date |
|---|---|---|
| 1,737,069 | Barber | Nov. 26, 1929 |
| 1,898,004 | Demka et al. | Feb. 21, 1933 |